(12) United States Patent
Pietschker et al.

(10) Patent No.: US 9,870,501 B2
(45) Date of Patent: Jan. 16, 2018

(54) METHOD AND APPARATUS FOR PROCESSING VALUE DOCUMENTS

(71) Applicant: GIESECKE & DEVRIENT GMBH, Munich (DE)

(72) Inventors: Andrej Pietschker, Munich (DE); Alfred Schmidt, Munich (DE); Jurgen Dietz, Munich (DE); Timo Kuhn, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 44 days.

(21) Appl. No.: 14/907,130

(22) PCT Filed: Jul. 23, 2014

(86) PCT No.: PCT/EP2014/002020
§ 371 (c)(1),
(2) Date: Jan. 22, 2016

(87) PCT Pub. No.: WO2015/010790
PCT Pub. Date: Jan. 29, 2015

(65) Prior Publication Data
US 2016/0171294 A1 Jun. 16, 2016

(30) Foreign Application Priority Data
Jul. 24, 2013 (DE) ........................ 10 2013 012 285

(51) Int. Cl.
*G06K 9/00* (2006.01)
*G07D 11/00* (2006.01)
*G07G 1/00* (2006.01)

(52) U.S. Cl.
CPC ..... *G06K 9/00335* (2013.01); *G06K 9/00469* (2013.01); *G07D 11/0051* (2013.01)

(58) Field of Classification Search
CPC .................................. G06K 9/00; G07D 11/00
(Continued)

(56) References Cited

U.S. PATENT DOCUMENTS

| 5,168,531 A | 12/1992 | Sigel |
| 6,694,058 B1 | 2/2004 | Burchart et al. |

(Continued)

FOREIGN PATENT DOCUMENTS

| DE | 19806024 A1 | 8/1999 |
| DE | 10233233 A1 | 2/2004 |

(Continued)

OTHER PUBLICATIONS

International Preliminary Report on Patentability for corresponding International PCT Application No. PCT/EP2014/002020, dated Jan. 26, 2016.

(Continued)

*Primary Examiner* — Abolfazl Tabatabai
(74) *Attorney, Agent, or Firm* — Workman Nydegger

(57) ABSTRACT

A method for processing value documents comprises the following steps: by means of a camera device an action of an operator of a value-document processing apparatus is captured. The captured image data are processed by means of an image processing device and at least one predetermined gesture is extracted from the processed image data. An input information item for the value-document processing apparatus is then allocated to the extracted gesture. The input information is provided in the value-document processing apparatus and processed there. The input information can represent a control information item or a data input information item.

19 Claims, 2 Drawing Sheets

(58) Field of Classification Search
USPC .......... 382/115, 118, 135–140; 235/17, 379, 235/381
See application file for complete search history.

(56) References Cited

U.S. PATENT DOCUMENTS

| | | | | |
|---|---|---|---|---|
| 7,100,818 | B2* | 9/2006 | Swaine | G06F 3/011 |
| | | | | 235/379 |
| 7,325,205 | B2* | 1/2008 | Duvel | G06F 3/04886 |
| | | | | 382/124 |
| 8,610,745 | B2* | 12/2013 | Shoji | G06F 3/04886 |
| | | | | 345/156 |
| 9,047,253 | B1* | 6/2015 | Gates | G06K 9/00335 |
| 2002/0041327 | A1 | 4/2002 | Hildreth et al. | |
| 2003/0038847 | A1 | 2/2003 | Duvel et al. | |
| 2004/0161132 | A1 | 8/2004 | Cohen et al. | |
| 2010/0134625 | A1 | 6/2010 | Bobbitt et al. | |
| 2011/0120015 | A1 | 5/2011 | Schmidt et al. | |
| 2011/0175802 | A1 | 7/2011 | Hsieh et al. | |
| 2012/0314076 | A1 | 12/2012 | Da Silva et al. | |

FOREIGN PATENT DOCUMENTS

| | | |
|---|---|---|
| DE | 202012005255 U1 | 6/2012 |
| EP | 0622722 A2 | 11/1994 |
| EP | 2319026 B1 | 5/2012 |
| WO | 0143083 A1 | 6/2001 |

OTHER PUBLICATIONS

International Search Report for corresponding International PCT Application No. PCT/EP2014/002020, dated Oct. 23, 2014.
German Search Report from corresponding German Application No. 102013012285.6, dated Feb. 28, 2014.

* cited by examiner

METHOD AND APPARATUS FOR PROCESSING VALUE DOCUMENTS

BACKGROUND

The present invention relates to a method for processing value documents and a corresponding value-document processing apparatus.

Value-document processing apparatus for processing different value documents, such as for example bank notes, checks, vouchers, coupons and the like are widely known. Many steps in the processing of such value documents are carried out automatically by the value-document processing apparatus, for example the singling of banknotes, the checking of different properties of the banknotes, such as for example of authenticity, denomination, fitness for circulation and the like. In the authenticity check for example different authenticity features can be checked automatically.

Despite the high degree of automation, operating staff continues to be required for operating a value-document processing apparatus. In order to further simplify and speed up the processing of documents, EP 2 319 026 B1 describes for example a value-document processing apparatus that is adapted to detect events which require an intervention by an operator. In the case that such an event occurs, for example a paper jam, the apparatus automatically opens a corresponding cover in the apparatus, in order to guide the operating staff directly to the corresponding error and to facilitate a manual intervention.

In WO 01/43083 A1 it is suggested to facilitate the operation of a value-document processing apparatus by configuring a display device to represent symbols and pictograms to which functions of the processing apparatus are allocated in each case. To control the apparatus, operating staff can effect an input via the pictograms, for example by means of a touch-sensitive input device, such as e.g. a touch pad. Also a voice control is described in the document.

SUMMARY

It is the object of the present invention to suggest a method and an apparatus which further simplifies and optimizes the processing of value documents.

The basic idea of the present invention is to utilize the recognition and evaluation of body gestures of at least one operator for controlling and inputting data in connection with the processing of value documents.

A method according to the invention for processing value documents accordingly comprises the following steps:

By means of a camera device, an action of an operator of a value-document processing apparatus is captured and image data of the captured action are generated. As camera device, therein in particular a 3D camera can be utilized, for example a stereo camera or a TOF camera. It is thus made possible to spatially capture and evaluate actions of the operator.

The image data generated by means of the camera device containing the action of the operator, are processed in a subsequent step by means of an image processing device. For image processing, known image processing systems can be utilized, which are meanwhile also commercially available. These comprise hardware and software means optimized for this task, such as for example processors optimized for processing graphics and software for pattern and image recognition. The image processing itself does not form part of the subject matter of the present invention.

By the image processing, at least one gesture is extracted from the processed image data, e.g. one of several predetermined gestures. The type and number of gestures recognizable by the image processing device can vary and can be dependent on the type of apparatus to be controlled and/or the type of data to be input in the apparatus.

To the at least one extracted gesture then an input information item for the value-document processing apparatus is allocated. The allocation is effected e.g. likewise by the image processing device. In principle, any input information can be allocated to any gesture. Thereby the present method provides utmost flexibility and adaptability.

The input information is then provided in the value-document processing apparatus, in order for the latter to be able to process this input information. The input information can be input in the value-document processing apparatus e.g. automatically, that is without a further inputting operation by the operator, can e.g. be sent in wireless or wired fashion to the apparatus. For example one or several gestures are predetermined in the image processing device and a corresponding input information item is allocated to each predetermined gesture. The image processing device allocates the corresponding input information to the extracted gesture and then sends this to the value-document processing apparatus, which receives the input information.

Alternatively, also the value-document processing apparatus itself can allocate the input information to the extracted gestures. The allocation as to which gesture corresponds to which input information item can be stored in the value-document processing apparatus itself or can be provided to the latter from outside, e.g. via a network.

Finally, the value-document processing apparatus processes the received input information. The input information can be a control information item or a data input information item. In the case of a gesture that corresponds to a data input information item, the value-document processing apparatus takes over the value document data contained in the data input information item and considers them when accounting the value documents. In the case of a gesture that corresponds to a control information item, the value-document processing apparatus then executes the control command contained in the control information item. The control information can initiate that the value-document processing device permits or executes a certain action or that the value-document processing apparatus does not permit or not execute a certain action (which it would otherwise execute due to its operation). The operator can emit a control information item by means of a gesture by which a certain action of the apparatus is prevented. For example, with the aid of a gesture, the operator can prevent the automatic opening of a door of the apparatus (in the case of a disturbance), if he/she is located in the area in front of the door.

For example, by a gesture of the operator a control information item is generated due to which the value-document processing apparatus initiates the appearance or closing of a display window in the operator display. By a gesture of the operator also such a control information item can be generated due to which a cursor movement on the operator display is initiated, such that the cursor—instead of by means of a computer mouse—can be moved by means of gestures. The cursor can also be caused to jump to a certain location on the operator display by means of a gesture, e.g. into an input box.

It can also be provided that the value-document processing apparatus confirms received input information items in a suitable fashion. Received control commands can be displayed or output acoustically for example for confirmation and/or verification. The same is applicable to received input data. This type of feedback permits a verification by the operator, for example in the case of critical control commands or to effect a final verification after inputting data.

The value-document processing apparatus can be a checking apparatus for value documents, e.g. a sorting apparatus, but it can also be a manual post-processing apparatus for value documents, where value documents are post-processed or captured which were rejected in a first check (e.g. reject banknotes).

Correspondingly, a system for processing value documents according to the invention comprises a camera device, an image processing device and a value-document processing apparatus. The camera device therein is adapted to capture an action of an operator of the value-document processing apparatus. The image processing device is adapted to process image data captured by the camera device and to extract at least one gesture from the processed image data. The value-document processing apparatus is adapted to process an input information item from the image processing device, the input information item being allocated to a gesture.

Accordingly, the invention makes it possible to substantially facilitate controlling and inputting data in a value-document processing apparatus. Simple gestures of the operator can be utilized for controlling the value-document processing apparatus and inputting data. A manual interaction of the operator with input interfaces of the apparatus becomes dispensable. This makes it possible to control the value-document processing apparatus also from a certain distance. A direct contact, for example by pressing buttons, operating levers or the like, and a direct data input by operating a keyboard or a touch screen can be omitted thereby. Working with the apparatus thus becomes easier and faster.

In connection with the present invention, the term "gesture" is to be interpreted broadly. In principle, a gesture can correspond to any characteristic information that can be extracted from image data capturing an action of an operator. A gesture can for example correspond to a predetermined body posture of the operator or a predetermined position of one or several body parts of the operator. Standard gestures for controlling the apparatus can for example correspond to a predetermined position of one or both arms in comparison to the torso of the operator. Different positions of a hand of an operator and/or of one or several fingers of the hand are suitable gestures for forming an input information item. The gesture can originate e.g. in the sign language of deaf-mute persons. Also a facial expression of an operator and/or eye movements can serve as gesture. Finally, predetermined movements of the body and/or of a body part of the operator can correspond to a predetermined gesture for inputting an input information item in the value-document processing apparatus.

Also the presence or absence of an operator or the distance of the operator to the value-document processing apparatus can be extracted from the image data and be incorporated in an input information item for the value-document processing apparatus, e.g. in a control information item. It is thus possible, e.g. in dependence on the presence or absence or distance of the operator, to execute, permit or prevent a certain action of the value-document processing apparatus that is allocated to a gesture extracted from the image data. For example the value-document processing apparatus may execute or permit a certain action only if an operator is in the direct vicinity of the value-document processing apparatus. The value-document processing apparatus processes e.g. certain input information only if at least two operators are in the direct vicinity of the value-document processing apparatus (dual custody principle). It can be required that these are certain operators who have identified themselves to the apparatus beforehand or have been recognized automatically by the apparatus, e.g. an operator and a supervisor.

From the processed image data also several gestures of several operators of the value-document processing apparatus can be extracted which are performed simultaneously or in mutually temporally offset fashion by these operators. These gestures can be incorporated in the same control information for the apparatus or in different control information items for the apparatus. The operators can be recognized by the apparatus automatically, e.g. by means of face recognition or by means of biometric data.

A complex gesture can be composed of two or more consecutive partial gestures. An input information item can for example consist of a control information item for a predetermined module of the value-document processing apparatus, prompting the module to start a processing procedure. The gesture can consist e.g. of three partial gestures. The first partial gesture indicates that a control information item is designated, in contrast to a data input information item. The second partial gesture designates the specific module at which the control information is directed. The third partial gesture finally designates the type of control information, e.g. the starting of a processing procedure. In this fashion, a large number of complex combination gestures can be compiled from a small number of different partial gestures. The pattern recognition required for processing the partial gestures is simple, the number of producible gestures is very high nevertheless, and the number of different input information items that can be input is correspondingly high. Since the complex gestures are composed of partial gestures, these can be learned by the operating staff quickly and easily. Thereby long training periods can be omitted and frequent operating errors can be avoided.

According to a first preferred embodiment of the method according to the invention, a control information item is allocated to a gesture as input information. The value-document processing apparatus is controlled by means of inputting the control information. In principle, almost any operations of the value-document processing apparatus can be controlled in this fashion, such as for example the opening/closing of a cover or of a lid of the apparatus, the starting or stopping of any processing procedures of individual modules of the apparatus, e.g. the starting or stopping of the transport of the value documents and/or the singling of the value documents.

According to a second preferred embodiment of the invention, a data input information item is allocated to a gesture as input information. By means of the data input information, then a data input is effected in the value-document processing apparatus. The data input therein can in particular concern the value documents processed by the value-document processing apparatus.

In principle, however, any data can be input in the value-document processing apparatus in this fashion, without requiring a conventional manual input apparatus for this purpose, such as for example a keyboard or the like. A data input can be effected in contactless fashion, in similarly simple fashion as a speech input. In comparison to the speech input, the advantage results that a gesture recognition is not impaired by machine noise and other ambient sounds.

In connection with the processing of value documents, a data input information item can relate in particular to a property of a processed value document, as mentioned. Properties of processed value documents are for example their authenticity, their denomination, their fitness for circulation, etc. The data input information can thus in particular serve to automatically capture corresponding properties of processed value documents, while an operator processes the value documents manually, for example in a manual post-processing of checking of the value documents.

According to a preferred variant of the second embodiment, a predetermined spatial area in the working area of the operator can be allocated to a data input information item. Such an area can be for example a marked region on a working surface. According to this variant, the data input information is allocated to a gesture, wherein the gesture in turn corresponds to a body position and/or a movement of the operator, by means of which the operator selects the spatial area which has been allocated to the data input information. Particularly preferably, the operator selects the area by depositing a value documents in this area.

Value documents which have not been recognized or have been recognized as forgeries by the value-document processing apparatus, in particular reject banknotes, are usually examined and assessed again by an operator in a separate processing step. By the invention, data concerning the value documents processed by the operator within the framework of a manual post-processing can be made available to the value-document processing apparatus in particularly simple fashion. During the post-processing, the operator for example deposits authentic and forged banknotes or reject banknotes on respectively separate stacks in dependence on the reject cause. When these stacks are stacked in predetermined regions of a working surface of the operator, with the above-described method the respectively deposited value documents can be automatically counted by the recognition of the gesture of depositing on the corresponding stack, without a corresponding data input by the operator being required subsequently, separately. In the same fashion, corresponding input data can be captured automatically when the post-processed banknotes are arranged in separate stacks in accordance with their denomination. Additionally, the camera device can capture information about the deposited value documents and add them to the input information, for example a serial number. Alternatively, it is possible that the camera device captures information of the value documents in order to verify the activity of the operator. When manually checked banknotes are sorted according to their denomination, in this way for example allocation errors can be recognized in simple fashion.

BRIEF DESCRIPTION OF THE DRAWINGS

The present invention will be described hereinafter by way of example with reference to the attached drawings. The figures are described as follows.

DETAILED DESCRIPTION OF VARIOUS EMBODIMENTS

Figure 1:
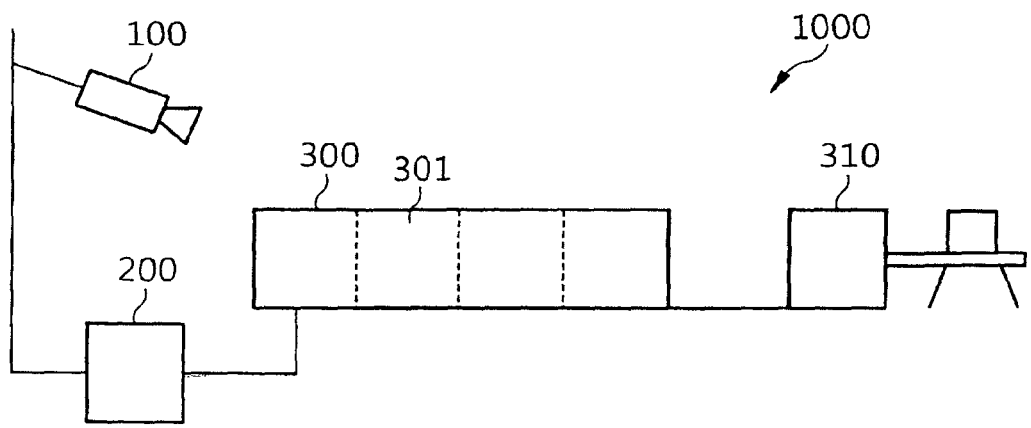
FIG. 1 a preferred embodiment of a system for processing value documents according to the invention.

A system 1000 for processing value documents shown by way of example in FIG. 1 comprises a camera device 100, an image processing device 200 and a value-document processing apparatus 300.

The camera device 100 is preferably supplied in the form of a 3D camera, by means of which it is possible to spatially capture an operator of the value-document processing apparatus 300. In this fashion any gestures of the operator, such as for example movements of the body or of individual body parts of the operator, body postures and positions of individual body parts, such as for example of the arms, of a hand, of the fingers of a hand, etc., can be accurately captured and processed.

Whereas in FIG. 1 only one camera 100 is indicated, the camera device 100 can of course consist of a plurality of cameras. The utilization of one or several stereo cameras or one or several TOF cameras is preferred.

The image processing device 200 is connected to the camera device 100 and the value-document processing apparatus 300. The image data generated by the camera device 100, in which an action of an operator is contained, are forwarded to the image processing device 200 for processing. The image processing device 200 is adapted to process the received image data. In particular, the image processing device 200 is adapted to extract predetermined gestures from the processed image data.

A predetermined input information item for the value-document processing apparatus 300 can then be allocated to an extracted gesture by means of the image processing apparatus 200. This input information allocated to an extracted gesture can be transmitted by means of the image processing apparatus 200 to the value-document processing apparatus 300 and can be processed by the same.

As image processing device 200 known, commercially available systems can be utilized, such as for example the KINECT system.

The value-document processing apparatus 300 is represented by way of example in the form of a banknote processing apparatus 300. Said apparatus comprises various modules, such as for example an input module, a singler module 301, a base module with a sensor path, a reject module, an output module and a shredder module (not all shown separately). Further, the value-document processing apparatus 300 can comprise a manual post-processing place 310 for the manual post-processing of banknotes rejected by the reject module.

In principle, the value-document processing apparatus 300 does not differ from known apparatus of this type, by the exception of the data connection to the image processing device 200 and the ability to process the input information items, such as received e.g. from the image processing apparatus 200. The image processing device 200 can be arranged outside or can be integrated in the value-document processing apparatus 300.

Alternatively thereto, the image processing device 200 extracts merely the gesture from the image data and sends a gesture information item corresponding to the gesture to the value-document processing apparatus. And the value-document processing apparatus allocates the gesture information item corresponding to the gesture to the respective input information, processing the latter.

Figure 2:
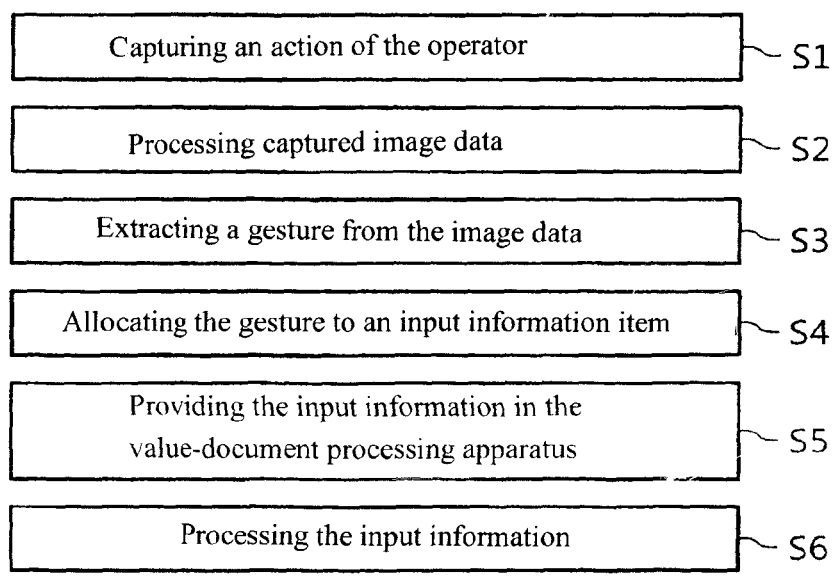
FIG. 2 steps of a preferred embodiment of a method for processing value documents.

With reference to FIG. 2 hereinafter individual steps will be described by way of example of a method for processing value documents by means of the system of FIG. 1.

In a first step S1 the camera device 100 captures an action of an operator 400 (compare FIG. 3) of the value-document processing apparatus 300. A corresponding action can for example consist of a specific control gesture of the operator 400. Such a gesture is described exemplarily in detail with reference to FIG. 3 in the following. An action of the operator 400 can alternatively for example also be a manual post-processing of value documents 700, which his described hereinafter with reference to FIG. 4.

In step S2 the image data captured by the camera device 100 are processed by the image processing device 200.

In step S3 the image processing device 200 extracts at least one gesture from the processed image data. Predetermined gestures are stored as reference data in the image processing device 200. The type and number of gestures can be varied or complemented in apparatus- or application-specific fashion.

In step S4 the image processing device 200 allocates an input information item for the banknote processing apparatus 300 to an extracted gesture. Such an allocation is defined beforehand as a rule and is also stored in the image processing device. In principle, any input information can be allocated to any predetermined gesture. In this fashion, the method can be adapted optimally to the present circumstances. This means that the allocation of gestures to input information items is freely programmable.

In step S5 the input information allocated to the extracted gesture is automatically input in the value-document processing apparatus 300 by the image processing device 200 sending the corresponding input information to the apparatus 300. A separate input operation by the operator 400 is not required for this purpose.

In step S6 finally the value-document processing apparatus 300 processes the received input information.

In principle, the input information can be a control information item for controlling the value-document processing apparatus 300. Alternatively, the input information can serve for inputting data in the value-document processing apparatus 300 and can accordingly be provided in the form of a data input information item. As a rule, the value-document processing apparatus 300 is adapted to receive and process input information both in the form of a control information item and in the form of a data input information item.

Figure 3:
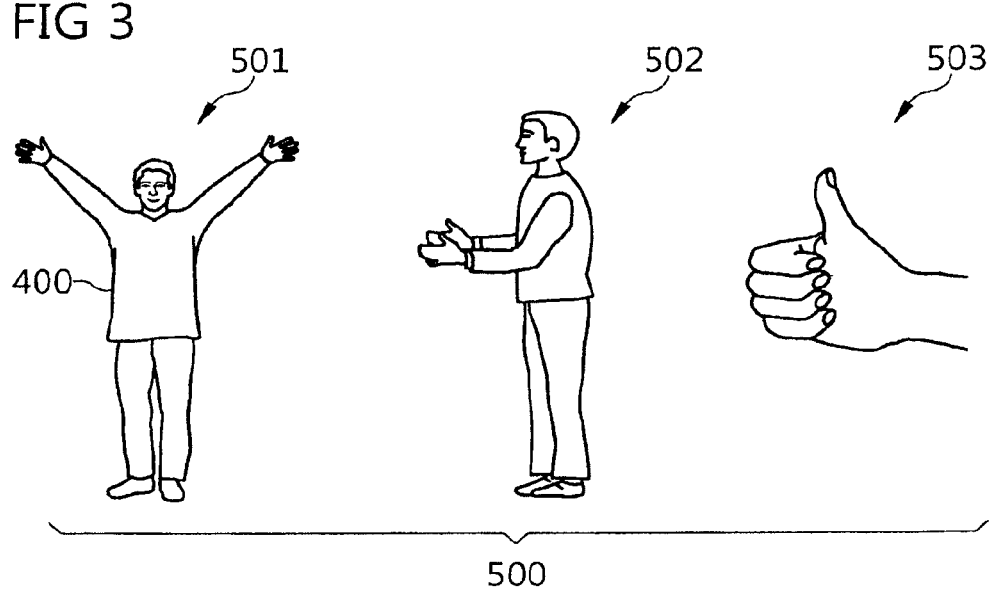
FIG. 3 by way of example a complex gesture composed of several partial gestures for controlling a value-document processing apparatus of FIG. 1.

With reference to FIG. 3 the inputting of an input information item in the form of a control information item is described exemplarily. The control information item in this case corresponds to the starting of a processing procedure of a specific module 301 of the banknote processing device 300, for example of a singler module 301.

In order to input such a control information item, the operator 400 can communicate by a gesture or by several partial gestures. For example the gesture 501 of FIG. 3 corresponds to opening the value-document processing apparatus, and the gesture 502 corresponds to stopping the singler of the value-document processing apparatus.

However, for example the operator 400 can also communicate with the banknote processing apparatus 300 by means of three consecutive partial gestures 501, 502 and 503. The combination of these three partial gestures 501, 502, 503 results in a complex combination gesture 500, to which the corresponding control information is then allocated.

With the first partial gesture 501, a raising of both arms, the operator 400 indicates that a control information item is to be input, in contrast to a data input information item. A raising of for example only one arm could designate a data input information item in contrast.

With the partial gesture 502, the pointing to the corresponding module 301, it is indicated that the control information concerns the module 301.

The third partial gesture 503, an extended thumb in a hand closed to form a fist, designates the starting of the processing operation allocated to the module, in the example thus the starting of a singling process.

In analogous fashion, complex control gestures can be composed of simple partial gestures. When for example the last partial gesture 503 is replaced by a flat hand, the corresponding combined gesture, i.e. the partial gestures 501, 502 in combination with the flat hand, could correspond to a control command stopping the operation started by means of the gesture 500.

Figure 4:
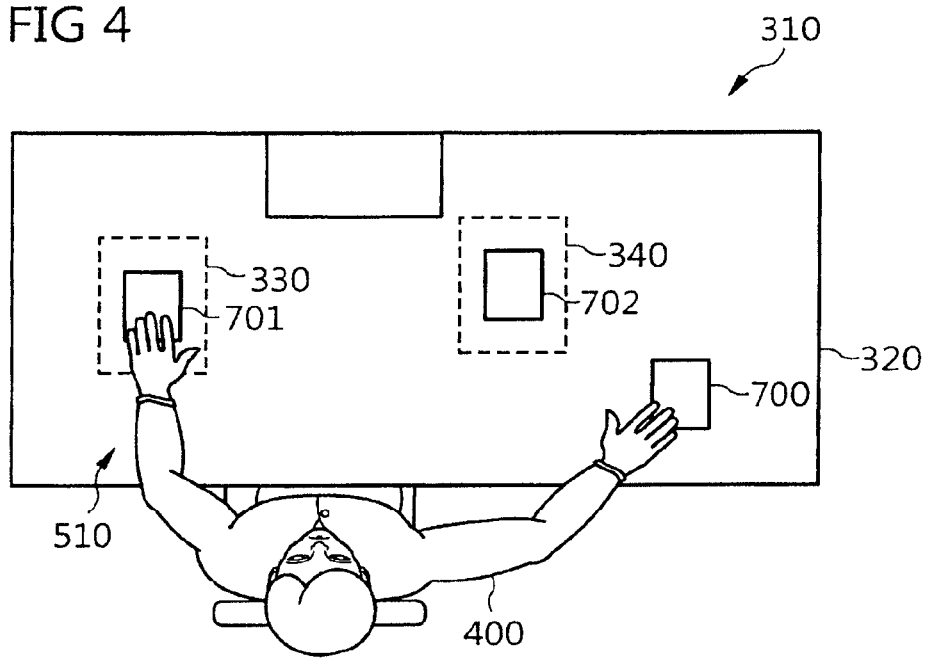
FIG. 4 exemplarily a gesture for inputting data in a value-document processing apparatus of FIG. 1.

With reference to FIG. 4, the inputting of a data input information item is represented exemplarily. Value documents 700 rejected by the banknote processing apparatus 300 are manually post-processed by an operator 400 at the manual post-processing place 310, for example sorted into authentic and forged banknotes. Therein the operator 400 stacks authentic banknotes 701 on a first stack in a predetermined area 330, and forged banknotes 702 on a second stack in a predetermined area 340 of a working surface 320.

The stacking of the banknotes in the corresponding areas 330, 340 is recognized by the image processing device 200 as a gesture of selecting the corresponding areas and allocated to a corresponding data input information item. In other words, each time when the operator 400 puts an authentic banknote 701 on the stack in the area 330, this is forwarded to the banknote processing device 300 as a data input information item, whereby the stacked authentic banknotes 701 can be counted automatically. This is correspondingly applicable to the depositing of the forged banknotes 702 on the second stack in the area 340.

In this fashion, a counting process can be effected automatically merely by capturing the action of the operator 400 during the manual checking of rejected banknotes by means of the camera device 100 and by processing corresponding image data by the image processing device 200. A step required so far of inputting data comprising the result of a manual post-processing, can thus be omitted. The procedure of post-processing is sped up thereby.

In analogous fashion, data of a manual post-processing can be captured for example when the operator stacks banknotes on separate stacks in dependence on their denomination.

The camera device 100 in combination with the image processing device 200 can further facilitate a manual post-processing by automatically capturing and processing additional data, such as e.g. serial numbers of processed value documents. The capturing of delivery documents, bands, etc., during the post-processing can additionally support a manual post-processing, since also here a manual inputting of data can be saved. To improve the processing of forgeries, further for example image data of forged banknotes can be captured by the camera device 100 and stored. It is understood that also such control commands to the banknote processing apparatus 300 that are required in connection with the post-processing, such as for example a command for starting an accounting of an amount of post-processed banknotes, can be effected in gesture-controlled fashion.

The invention claimed is:

1. A method for processing value documents, comprising the steps of:

capturing an action of an operator of a value-document processing apparatus by means of a camera device and generating image data of the captured action;

processing the generated image data by means of an image processing device;

extracting at least one gesture from the processed image data by the image processing device, the gesture being composed of two or more consecutive partial gestures, at least one partial gesture designating a specific module of the value-document processing apparatus;

allocating the at least one gesture to an input information item for the value-document processing apparatus, the input information item including a control information item for the specific module of the value-document processing apparatus designated with the partial gesture;

providing the input information in the value-document processing apparatus; and processing the input information by the value-document processing apparatus.

2. The method according to claim 1, wherein a gesture corresponds to a predetermined body posture of the operator or a predetermined position of a body part of the operator.

3. The method according to claim 1, wherein a gesture corresponds to a predetermined facial expression of the operator.

4. The method according to claim 1, wherein a gesture corresponds to a predetermined movement of the body and/or a body part of the operator.

5. The method according to claim 1, wherein a gesture corresponds to a plurality of consecutive partial gestures.

6. The method according to claim 1, wherein to the at least one gesture a control information item is allocated as input information, and the value-document processing apparatus is controlled on the basis of the control information item.

7. The method according to claim 1, wherein to the at least one gesture a data input information item is allocated as input information, and an inputting of data in the value-document processing apparatus is effected on the basis of the data input information item.

8. The method according to claim 7, wherein the data input information concerns a property of a processed value document.

9. The method according to claim 7, wherein there is allocated to the data input information a predetermined spatial area in the working area of the operator and that the data input information is allocated to a gesture corresponding to a body position and/or a movement of the operator, by means of which the operator selects the spatial area, wherein the operator selects the area in particular by depositing a value document in the area.

10. A system for processing value documents, comprising a camera device, an image processing device and a value-document processing apparatus, wherein the camera device is adapted to capture an action of an operator of the value-document processing apparatus and to generate image data of the captured action, the image processing device is adapted to process the image data generated by the camera device and to extract at least one gesture from the processed image data, the gesture being composed of two or more consecutive partial gestures, at least one partial gesture designating a specific module of the value-document processing apparatus, and the value-document processing apparatus is adapted to process an input information item allocated to the gesture that is provided in the value-document processing apparatus, the input information item including a control information item for the specific module of the value-document processing apparatus designated with the partial gesture.

11. The system according to claim 10, wherein the image processing device is adapted to send a gesture information item corresponding to the extracted gesture to the value-document processing apparatus, and the value-document processing apparatus is adapted to allocate the gesture information to an input information item for the value-document processing apparatus.

12. The system according to claim 10, wherein the image processing device is adapted to allocate the extracted gesture to an input information item for the value-document processing apparatus and to send said information item to the value-document processing apparatus, and the value-document processing apparatus is adapted to receive and process the input information sent by the image processing device.

13. The system according to claim 10, wherein the value-document processing apparatus is adapted to process an input information item in the form of a control information item.

14. The system according to claim 10, wherein the value-document processing apparatus is adapted to process an input information item in the form of a data input information item.

15. The system according to claim 10, wherein the camera device is configured as a 3D camera, in particular as a stereo camera or TOF camera.

16. A method for processing value documents, comprising the steps of:

capturing an action of an operator of a value-document processing apparatus by means of a camera device and generating image data of the captured action;

processing the generated image data by means of an image processing device;

extracting at least one gesture from the processed image data by the image processing device;

allocating the at least one gesture to an input information item for the value-document processing apparatus, wherein a data input information item concerning a property of a processed value document is allocated to the at least one gesture as input information;

providing the data input information item concerning the property of the processed value document in the value-document processing apparatus; and processing the data input information item concerning the property of the processed value document by the value-document processing apparatus, wherein the data input information item concerning the property of the processed value document serves to automatically capture corresponding properties of processed value documents, while an operator processes the value documents manually.

17. The method according to claim 16, wherein the data input information item relates to the authenticity of the processed value document.

18. The method according to claim 16, wherein the data input information item relates to the denomination of the processed value document.

19. The method according to claim 16, wherein the data input information item relates to the fitness for circulation of the processed value document.

* * * * *